United States Patent
Connolly et al.

(10) Patent No.: US 9,358,981 B2
(45) Date of Patent: Jun. 7, 2016

(54) METHODS AND SYSTEM FOR IMPROVING LAUNCHING OF A HYBRID VEHICLE

(71) Applicant: Ford Global Technologies, LLC, Dearborn, MI (US)

(72) Inventors: Francis Thomas Connolly, Ann Arbor, MI (US); Daniel Colvin, Farmington Hills, MI (US); Xiaoyong Wang, Novi, MI (US); Jeffrey Edwin Knutson, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/465,664

(22) Filed: Aug. 21, 2014

(65) Prior Publication Data

US 2016/0052517 A1  Feb. 25, 2016

(51) Int. Cl.
*B60W 30/18* (2012.01)
*B60W 20/00* (2016.01)
*B60W 10/08* (2006.01)
*B60W 10/02* (2006.01)

(52) U.S. Cl.
CPC ....... *B60W 30/18027* (2013.01); *B60W 10/023* (2013.01); *B60W 10/08* (2013.01); *B60W 20/10* (2013.01); *Y10S 903/93* (2013.01)

(58) Field of Classification Search
CPC ... B60W 10/023; B60W 10/08; B60W 20/00; B60W 20/10; B60W 20/108; B60W 20/1082; B60W 30/18027; Y10S 903/93
USPC .......................................................... 701/22
See application file for complete search history.

(56) References Cited

U.S. PATENT DOCUMENTS

| 9,056,603 | B2 * | 6/2015 | Kar ........................ B60W 10/06 |
| 2002/0179047 | A1 | 12/2002 | Hoang et al. |
| 2010/0234174 | A1 * | 9/2010 | Miyazaki ............... B60K 6/387 477/5 |
| 2011/0246008 | A1 * | 10/2011 | Yoshida ................... B60K 6/48 701/22 |
| 2013/0296106 | A1 | 11/2013 | Dai et al. |
| 2013/0297118 | A1 | 11/2013 | Reed et al. |
| 2013/0297123 | A1 | 11/2013 | Gibson et al. |
| 2013/0297160 | A1 | 11/2013 | Kar et al. |
| 2015/0065297 | A1 * | 3/2015 | Hoshiba ................ B60W 20/10 477/19 |
| 2015/0203099 | A1 * | 7/2015 | Kasuya .................... B60K 6/48 701/22 |

OTHER PUBLICATIONS

Yamazaki, Mark S. et al., "Methods and System for Launching a Hybrid Vehicle," U.S. Appl. No. 14/465,639, filed Aug. 21, 2014, 34 pages.

* cited by examiner

*Primary Examiner* — Thomas Tarcza
*Assistant Examiner* — Tyler J Lee
(74) *Attorney, Agent, or Firm* — David Kelley; Alleman Hall McCoy Russell & Tuttle LLP

(57) ABSTRACT

Systems and methods for improving launching of a stopped hybrid vehicle are presented. The systems and methods adjust speed of a motor to reduce lag between an increase in driver demand torque and torque being produced at vehicle wheels. In one example, motor torque is adjusted to a maximum motor torque to improve vehicle launch during select conditions where driver demand torque is not a maximum level.

20 Claims, 4 Drawing Sheets

METHODS AND SYSTEM FOR IMPROVING LAUNCHING OF A HYBRID VEHICLE

FIELD

The present description relates to methods and a system for launching a hybrid vehicle from rest after an engine and electric machine in the hybrid vehicle have stopped rotating. The methods may be particularly useful for hybrid vehicles that include a torque converter and an automatic transmission.

BACKGROUND AND SUMMARY

Hybrid vehicles may include a motor and an engine to provide improved fuel economy as compared to a non-hybrid vehicle. The motor may assist the engine or operate separately from the engine to propel the vehicle. The vehicle's hydrocarbon fuel economy may be increased by stopping engine rotation and propelling the vehicle solely via the motor. Additionally, during some conditions, such as when the hybrid vehicle is stopped, it may be desirable to stop motor rotation to conserve electrical energy. Thus, there may be selected conditions when both the engine and the motor are stopped to conserve energy. However, stopping the motor and engine also stops torque converter impeller rotation which may increase a lag time between an increase in driver demand torque and producing noticeable torque at vehicle wheels. Therefore, it would be desirable to provide reduced lag in response to an increase in driver demand torque while still allowing the motor to stop for energy conservation purposes.

The inventors herein have recognized the above-mentioned disadvantages and have developed a driveline method, comprising: applying a torque via a driveline integrated starter/generator (DISG) to a torque converter impeller from a condition where DISG rotation is stopped in response to a driver demand torque greater that a first threshold and less than a second threshold, the torque at least thirty percent greater than the driver demand torque.

By supplying a torque that is greater than a driver demand based torque to a torque converter impeller, it may be possible to provide the technical result of reducing delay between an increase in driver demand torque and an increase in wheel torque. Further, electric machine or motor speed may be adjusted based on a compensation torque after the electric machine achieves a torque converter fluid force transfer speed so that wheel torque increases smoothly at a time when transmission pump output pressure is increasing. In this way, the torque converter impeller speed may be accelerated quickly to a speed where a transmission pump output pressure increases and torque transfer to the torque converter turbine begins. After reaching the torque converter fluid force transfer speed, the torque converter impeller speed may be adjusted to provide torque at the torque converter turbine that is related to the driver demand torque. As a result, accelerator tip-in (e.g., increasing accelerator pedal position) response may be improved by reducing torque delay so that the driver demand torque may be applied to vehicle wheels sooner.

The present description may provide several advantages. In particular, the approach may reduce wheel torque production delay in a driveline. Further, the approach may allow driver demand torque to be followed more closely. Further still, the approach may allow a vehicle to perform better after the vehicle's motor has stopped rotating to conserve electrical energy.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
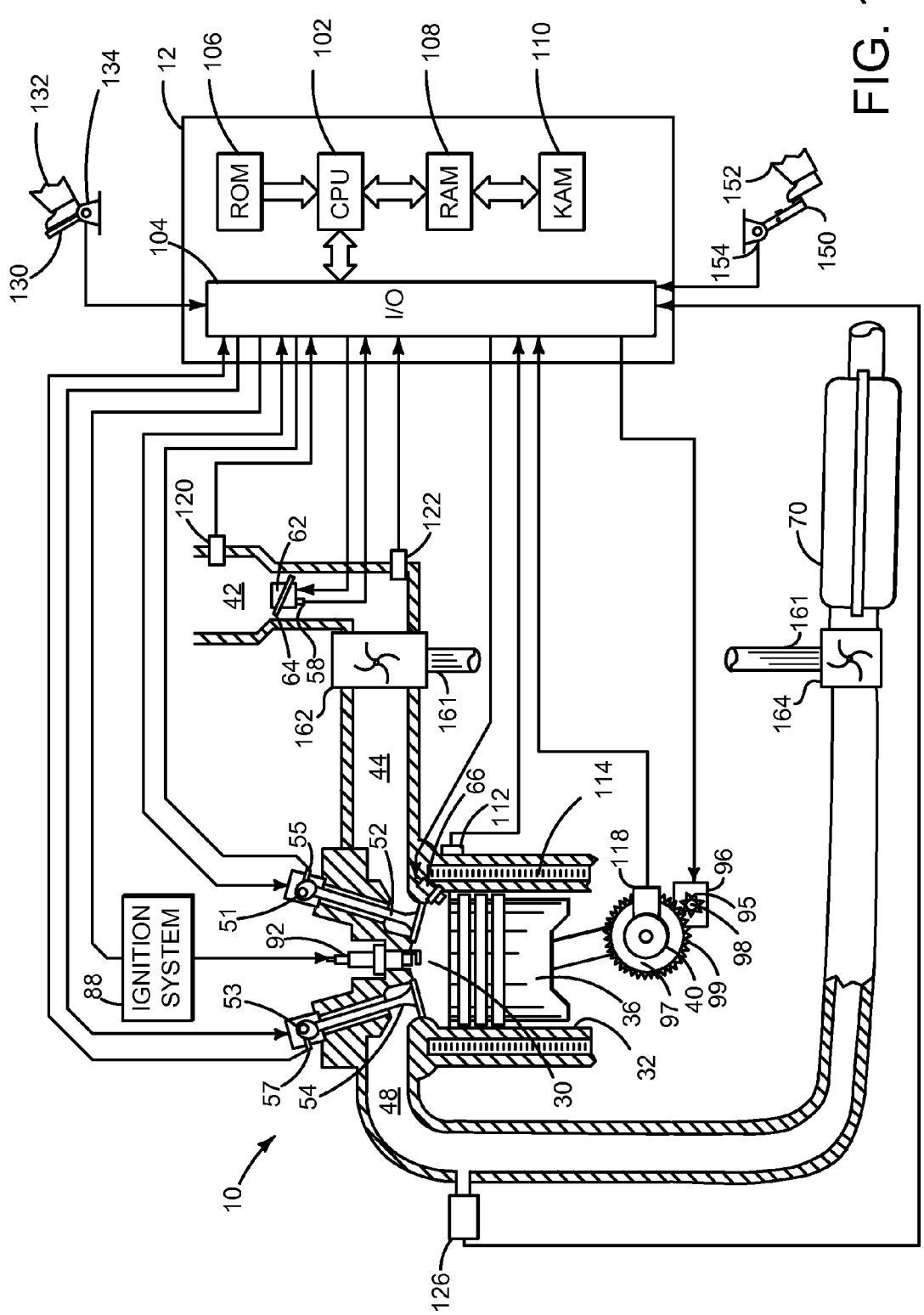
FIG. 1 is a schematic diagram of an engine.
Figure 2:
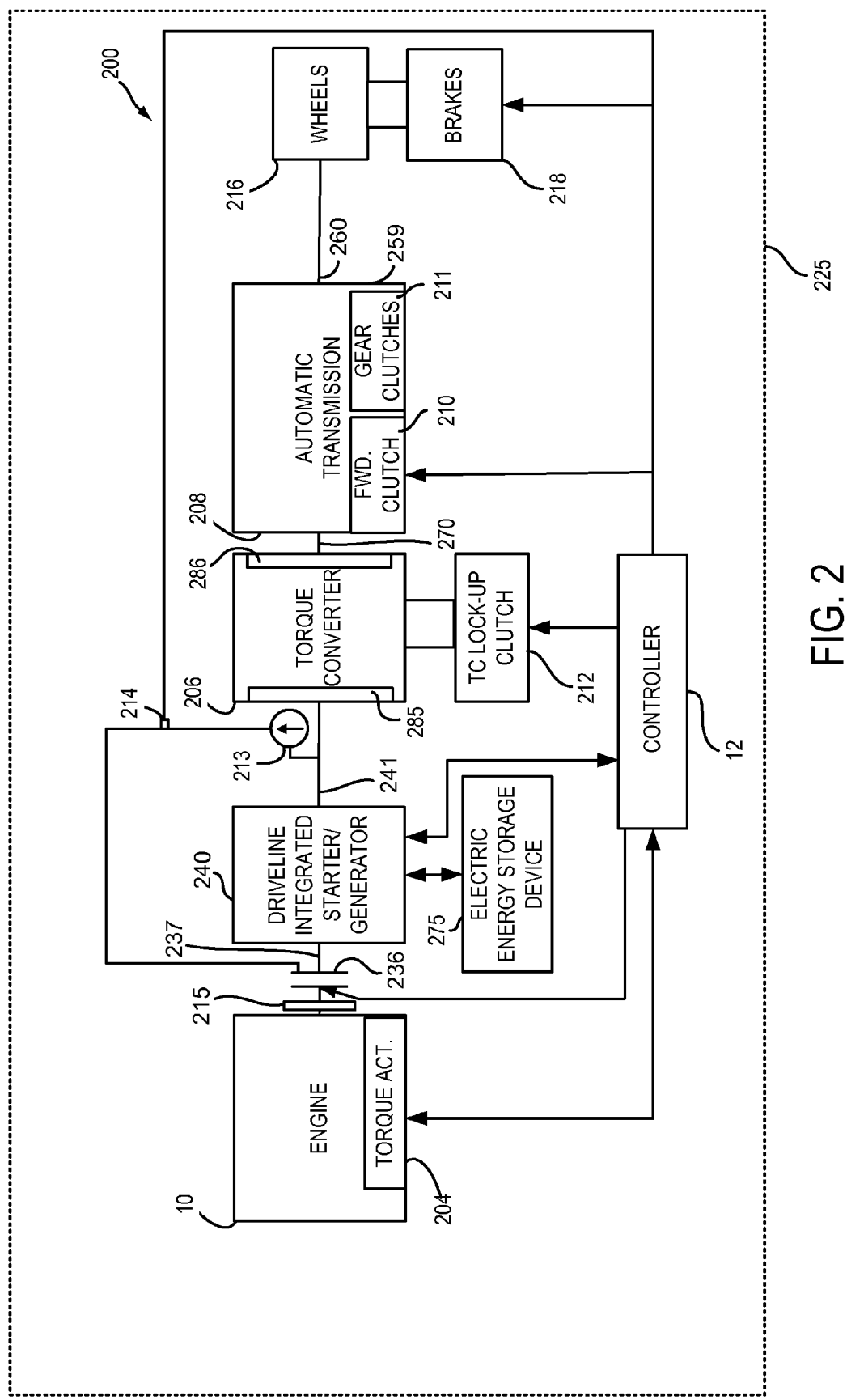
FIG. 2 shows an example vehicle driveline configuration.
Figure 3:
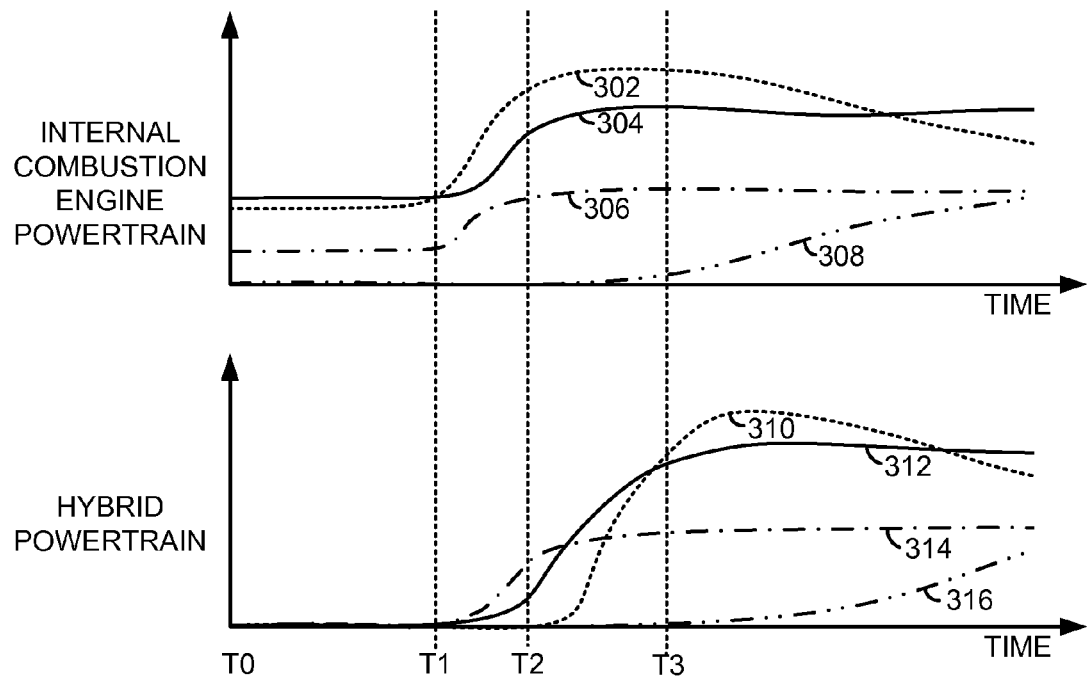
FIGS. 3 and 4 show example vehicle launch sequences.
Figure 4:
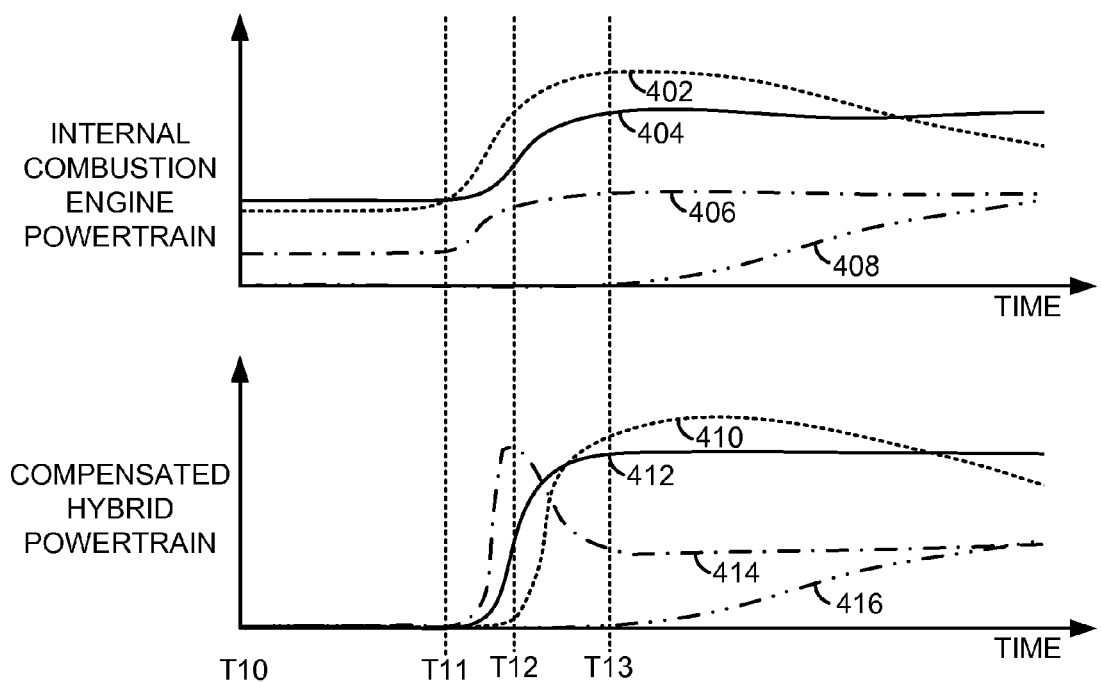

The present description is related to improving a vehicle launch from stop. A hybrid vehicle may include an engine as is shown in FIG. 1. Additionally, the engine may be included in a driveline of the hybrid vehicle as is shown in FIG. 2. The vehicle may launch from stopped conditions as is shown in the sequences of FIGS. 3 and 4. The vehicle may include a controller that includes instructions according to the method of FIG. 5.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width from controller 12. Fuel is delivered to fuel injector 66 by a fuel system (not shown) including a fuel tank, fuel pump, and fuel rail (not shown).

In addition, intake manifold 44 is shown communicating with turbocharger compressor 162. Shaft 161 mechanically couples turbocharger turbine 164 to turbocharger compressor 162. Optional electronic throttle 62 adjusts a position of throttle plate 64 to control air flow from air intake 42 to compressor 162 and intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a driveline 200. The driveline of FIG. 2 includes engine 10 shown in FIG. 1. Driveline 200 may be powered by engine 10. Engine 10 may be started with an engine starting system shown in FIG. 1 or via driveline integrated starter/generator (DISG) 240. DISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input side of driveline disconnect clutch 236 through dual mass flywheel 215. Disconnect clutch 236 may be electrically or hydraulically actuated. If disconnect clutch 236 is hydraulically actuated, pump 213 supplies working fluid (e.g., oil) to driveline disconnect clutch 236. Pump 213 may be incorporated into torque converter 206 or transmission 208, and pump 213 rotates to supply pressurized working fluid to driveline disconnect clutch 236 and clutches 210-211. Pump 213 is mechanically driven and it rotates to pressurize working fluid when shaft 241 rotates. Pressure at an outlet of pump 213 may be determined via pressure sensor 214. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 (e.g., high voltage battery or power source) may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 (e.g., 1-10) and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by craning engine 10 and resuming cylinder combustion.

Thus, the system of FIGS. 1 and 2 provides for a driveline system, comprising: an engine; an electric machine; an automatic transmission; a torque converter positioned between the automatic transmission and the electric machine; a controller including executable instructions stored in non-transitory memory for applying maximum torque of an electric machine to a torque converter impeller from a condition where electric machine rotation is stopped in response to a driver demand torque less than the maximum torque of the electric machine. The driveline system further comprises additional instructions for reducing electric machine torque to less than the maximum torque of the electric machine from the condition where electric machine rotation is stopped in response to a driver selecting an economy mode.

In some examples, the driveline system further comprises additional instructions for reducing the maximum torque of the electric machine in response to the torque converter impeller achieving a fluid force transfer speed. The driveline system further comprises additional instructions for applying the driver demand torque to the torque converter turbine via adjusting electric machine speed to a speed that provides the driver demand torque at the torque converter turbine. The driveline system further comprises reducing application of torque to the torque converter impeller from the condition where electric machine rotation is stopped in response to selection of an economy mode. The driveline system further comprises additional instructions for applying the driver demand torque to the torque converter impeller in response to an increase in the driver demand torque when a vehicle in which the electric machine operates is stopped and the electric machine is rotating.

Referring now to FIG. 3, a vehicle launch sequence for a conventional internal combustion engine powertrain is shown along with a vehicle launch sequence for an uncompensated hybrid vehicle.

The first plot from the top of FIG. 3 is a plot of torque converter impeller speed, impeller torque, turbine speed, and turbine torque for a conventional powertrain (e.g., internal combustion engine and torque converter, no motor present) versus time. The Y axis arrow indicates a direction for increasing torque converter impeller speed and torque. The Y axis arrow also indicates a direction for increasing torque converter turbine speed and torque. The X axis represents time and time increases from the left side of FIG. 3 to the right side of FIG. 3. Trace 302 represents torque converter turbine torque. Trace 304 represents torque converter impeller speed. Trace 306 represents torque converter impeller torque. Trace 308 represents torque converter turbine speed.

The second plot from the top of FIG. 3 is a plot of torque converter impeller speed, impeller torque, turbine speed, and turbine torque for an uncompensated hybrid vehicle powertrain versus time. The Y axis arrow indicates a direction for increasing torque converter impeller speed and torque. The Y axis arrow also indicates a direction for increasing torque converter turbine speed and torque. The X axis represents time and time increases from the left side of FIG. 3 to the right side of FIG. 3. In this example, the uncompensated hybrid vehicle powertrain torque converter impeller torque profile is the same as for the conventional powertrain torque converter impeller. Trace 310 represents torque converter turbine torque. Trace 312 represents torque converter impeller speed. Trace 314 represents torque converter impeller torque. Trace 316 represents torque converter turbine speed.

At time T0, the internal combustion engine of the conventional powertrain is operating at idle speed. Therefore, the torque converter impeller speed and torque converter impeller torque for the conventional powertrain are non-zero and elevated. The torque converter turbine torque for the conventional powertrain is also non-zero and elevated. The torque converter turbine speed for the conventional powertrain is substantially zero.

The hybrid vehicle's engine and motor are at zero speed to conserve fuel and electrical charge. Consequently, the torque converter impeller speed and torque converter impeller torque are zero for the hybrid powertrain. Additionally, the torque converter turbine speed and torque converter turbine torque for the hybrid powertrain are also zero.

At time T1, torque is applied to both the torque converter impeller of the conventional powertrain and the torque converter impeller of the hybrid powertrain in response to an increase in driver demand torque (not shown). The torque converter impeller speed, impeller torque, and turbine torque for the conventional powertrain begin to increase almost instantaneously. The torque converter turbine speed for the conventional powertrain does not begin to move. On the other hand, the torque converter impeller speed and torque for the hybrid powertrain begin to increase after a short delay. The torque converter turbine torque increase for the hybrid powertrain is delayed further since the torque converter transfers little torque when the torque converter impeller speed is less than a torque converter fluid force transfer speed.

At time T2, the torque converter turbine torque for the hybrid powertrain begins to increase. The torque converter impeller speed and torque for the hybrid powertrain have increased from zero speed and continue to rise. The torque converter turbine speed for the hybrid powertrain remains at zero since sufficient turbine torque is not present to rotate the torque converter turbine for the hybrid powertrain.

The rate of rise for the torque converter impeller torque and speed begins to be reduced for the conventional powertrain. The rate of rise for the conventional powertrain torque converter turbine torque also begins to be reduced, but the conventional powertrain torque converter turbine speed begins to increase.

At time T3, the torque converter turbine speed for the hybrid powertrain begins to increase. The rate of rise for the torque converter impeller speed and torque is starting to be reduced for the hybrid powertrain. The torque converter turbine speed for the hybrid powertrain begins to increase in response to the torque converter turbine torque increasing.

The torque converter turbine torque and speed for the conventional powertrain level off. The torque converter turbine torque also continues to rise.

The time between time T1 and time T3 is the torque delay time for the hybrid powertrain. In this example, the torque delay time is measured from the time the driver increases the driver demand torque until the hybrid powertrain torque converter turbine speed begins to increase. The delay time results from having to accelerate the DISG from zero speed to a speed where the torque converter begins to transfer torque from the torque converter impeller to the torque converter turbine.

Referring now to FIG. 4, a vehicle launch sequence for a conventional internal combustion engine powertrain is shown along with a vehicle launch sequence for an compensated hybrid vehicle. The vehicle launch sequence for the conventional powertrain is the same as is shown in FIG. 3.

The first plot from the top of FIG. 4 is a plot of torque converter impeller speed, impeller torque, turbine speed, and turbine torque for the conventional powertrain (e.g., internal combustion engine and torque converter, no motor present) versus time. The Y axis arrow indicates a direction for increasing torque converter impeller speed and torque. The Y axis arrow also indicates a direction for increasing torque converter turbine speed and torque. The X axis represents time and time increases from the left side of FIG. 4 to the right side of FIG. 4. Trace 402 represents torque converter turbine torque. Trace 404 represents torque converter impeller speed. Trace 406 represents torque converter impeller torque. Trace 408 represents torque converter turbine speed.

The second plot from the top of FIG. 4 is a plot of torque converter impeller speed, impeller torque, turbine speed, and turbine torque for a compensated hybrid vehicle powertrain versus time. The Y axis arrow indicates a direction for increasing torque converter impeller speed and torque. The Y axis arrow also indicates a direction for increasing torque converter turbine speed and torque. The X axis represents time and time increases from the left side of FIG. 4 to the right side of FIG. 4. Trace 410 represents torque converter turbine torque. Trace 412 represents torque converter impeller speed. Trace 414 represents torque converter impeller torque. Trace 416 represents torque converter turbine speed.

At time T10, the internal combustion engine of the conventional powertrain is operating at idle speed. Therefore, the torque converter impeller speed and torque converter impeller torque for the conventional powertrain are non-zero and elevated. The torque converter turbine torque for the conventional powertrain is also non-zero and elevated. The torque converter turbine speed for the conventional powertrain is substantially zero.

The compensated hybrid vehicle's engine and motor are at zero speed to conserve fuel and electrical charge. Consequently, the torque converter impeller speed and torque converter impeller torque are zero for the compensated hybrid powertrain. Additionally, the torque converter turbine speed and torque converter turbine torque for the compensated hybrid powertrain are also zero.

At time T11, torque is applied to both the torque converter impeller of the conventional powertrain and the torque converter impeller of the compensated hybrid powertrain in response to driver demand torque (not shown). Full or maximum DISG torque is applied to the torque converter impeller of the compensated hybrid powertrain in response to an increase in driver demand torque. Therefore, the impeller torque of the compensated hybrid powertrain increases faster than the impeller torque of the uncompensated hybrid powertrain shown in FIG. 3. The torque converter impeller speed, impeller torque, and turbine torque for the conventional powertrain begin to increase almost instantaneously. The torque converter turbine speed for the conventional powertrain does not begin to move. The torque converter impeller speed for the compensated hybrid powertrain also increases at a faster rate than the torque converter impeller speed for the uncompensated hybrid powertrain shown in FIG. 3. The torque converter turbine speed for the compensated hybrid powertrain remains at zero.

At time T12, the torque converter turbine torque for the compensated hybrid powertrain begins to increase. The torque converter impeller speed for the compensated hybrid powertrain continues to rise. The torque converter impeller torque for the compensated hybrid powertrain has reached a peak value and is declining. The torque converter turbine speed for the compensated hybrid powertrain remains at zero since sufficient turbine torque is not present to rotate the torque converter turbine for the hybrid powertrain.

The rate of rise for the torque converter impeller torque and speed begins to be reduced for the conventional powertrain. The rate of rise for the conventional powertrain torque converter turbine torque also begins to be reduced, and the conventional powertrain torque converter turbine speed remains at zero.

At time T13, the torque converter turbine speed for the compensated hybrid powertrain begins to increase. The rate of rise for the torque converter impeller speed has leveled off and the torque converter impeller torque also levels off for the compensated hybrid powertrain. The torque converter turbine speed for the compensated hybrid powertrain begins to increase in response to the torque converter turbine torque increasing.

The torque converter turbine speed for the conventional powertrain also begins to increase, and the torque converter turbine torque for the conventional powertrain has leveled off. The torque converter impeller torque and torque converter impeller speed for the conventional powertrain have also leveled off.

The time between time T11 and time T13 is the torque delay time for the compensated hybrid powertrain. The torque delay time is reduced significantly from the torque delay time of the uncompensated hybrid powertrain. Thus, by applying full torque to the DISG in response to an increase in driver demand torque, it may be possible to improve the response of the hybrid powertrain responding from zero speed.

Figure 5:
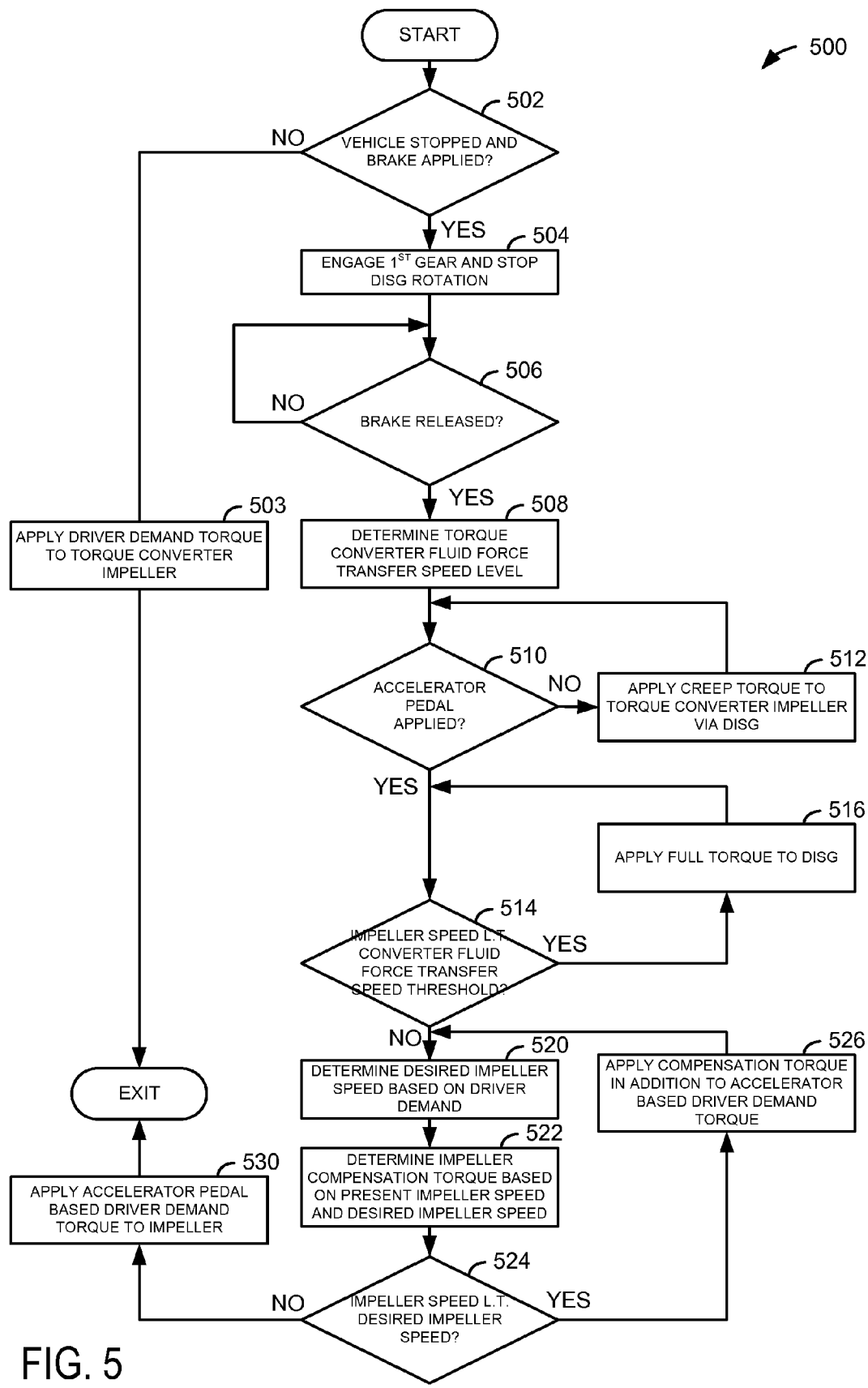
FIG. 5 shows an example method for improving launch of a hybrid vehicle.

Referring now to FIG. 5, a method for improving launch of a hybrid vehicle is shown. The method of FIG. 5 may provide the operating sequence shown in FIG. 4. Additionally, the method of FIG. 5 may be included in the system of FIGS. 1 and 2 as executable instructions stored in non-transitory memory.

At 502, method 500 judges if the vehicle is stopped and the vehicle brake is applied. The vehicle may be judged stopped when vehicle speed is zero and the vehicle brake may be judged to be applied in response to an output of a brake pedal position sensor. If method 500 judges that the vehicle is stopped and the brake pedal is applied, the answer is yes and method 500 proceeds to 504. Otherwise, the answer is no and method 500 proceeds to 503. In other examples, additional or fewer conditions may be required to be met before method 500 proceeds to 504.

If the DISG and engine are rotating when the vehicle is stopped and the brake applied, a torque equivalent to the driver demand based torque may be provided to the torque converter impeller via the DISG or the engine in response to an increase in driver demand torque greater than a first threshold torque and less than a second threshold torque.

At 503, method 500 provides a driver demand torque to the torque converter impeller. Further, the transmission gears may be shifted according to a predetermined schedule. Method 500 proceeds to exit after driver demand torque is applied to the torque converter impeller.

At 504, method 500 engages first gear and stops the DISG and the engine from rotating. The engine may be stopped by stopping fuel flow and spark to the engine. The DISG may be stopped by stopping current flow to the DISG. Method 500 proceeds to 506 after the engine and DISG have stopped rotating.

At 506, method 500 judges if the vehicle brake has been released. Method 500 may judge that the vehicle brake has been released in response to an output of a brake position sensor. Alternatively, or in addition, method 500 may also proceed to 508 in response to the accelerator pedal being applied. If method 500 judges that the vehicle brake has been released, the answer is yes and method 500 proceeds to 510. Otherwise, the answer is no and method 500 returns to 506.

At 508, method 500 determines the torque converter fluid force transfer speed. In one example, the torque converter fluid force transfer speed is empirically determined and stored to memory and indexed via working fluid (e.g., oil) temperature and impeller input torque. The impeller input torque may be determined via DISG current and/or engine speed and load. The torque converter fluid force transfer speed is an impeller speed below which full DISG torque can be applied to the torque converter impeller without sending an undesirable amount of torque into the transmission. For example, the torque converter may transfer less than five percent of the torque input to the torque converter impeller at impeller speeds less than the torque converter fluid force transfer speed. The torque converter fluid force transfer speed may be less than a base (e.g., warm) engine idle speed. Method 500 indexes the table or function storing the torque converter fluid force transfer speed, determines the torque converter fluid force transfer speed, and proceeds to 510.

At 510, method 500 judges whether or not the accelerator pedal has been applied by more than a threshold amount; however in some examples, method 500 judges if driver demand torque is greater than a first threshold and less than a second threshold. In one example the first threshold may be less than five percent of full scale driver demand torque and the second threshold may be greater than sixty five percent of full scale driver demand torque. Of course, the first and second threshold may be different for different applications.

Method 500 may judge if an accelerator pedal has been applied based on output of an accelerator pedal position sensor. The accelerator pedal position may be converted in to a driver demand torque based on vehicle speed and accelerator pedal position. If method 500 judges that the accelerator pedal has been applied and driver demand torque has increased by a threshold amount, the answer is yes and method 500 proceeds to 514. Otherwise, the answer is no and method 500 proceeds to 512. Alternatively, if method 500 judges that the accelerator pedal or driver demand torque is greater than a first threshold and less than a second threshold, the answer is yes and method 500 proceeds to 514. Otherwise, the answer is no and method 500 proceeds to 512.

At 512, method 500 enters creep mode by opening the driveline disconnect clutch and rotating the DISG to provide torque sufficient to propel the vehicle at a low speed (e.g., less than 8 KPH) on a flat road. However, if battery state of charge is low, the engine may be started and accelerated to an idle speed such that the engine provides torque sufficient to propel the vehicle at a low speed. Method 500 returns to 510 after the vehicle is placed in creep mode.

At 514, method 500 judges if the torque converter impeller speed is less than a torque converter fluid force transfer speed threshold. The fluid force transfer speed may be empirically determined and stored to controller memory as is described at 508. If method 500 judges that torque converter impeller speed is less than a torque converter fluid force transfer speed threshold, the answer is yes and method 500 proceeds to 516. Otherwise, the answer is no and method 500 proceeds to 520.

At 516, method 500 supplies full or maximum DISG torque to the torque converter impeller. In some modes, the driveline disconnect clutch may be open when maximum DISG torque is applied to the torque converter impeller. In other examples, the driveline disconnect clutch may be closed when maximum DISG torque is applied to the torque converter impeller. Additionally, in some examples, a fractional amount of maximum DISG torque, but still greater than driver demand based torque, may be applied to the torque converter impeller (e.g., sixty percent of maximum DISG torque) instead of full DISG torque. For example, if a driver selects an economy mode, sixty percent of maximum DISG torque may be provided to the torque converter impeller via the DISG in response to a request for thirty percent of maximum DISG torque. In this way, the DISG torque is not adjusted proportionately with driver demand torque before torque converter impeller speed achieves the torque converter fluid force transfer speed, but is adjusted proportionally with driver demand torque thereafter, in one example. Further, a threshold of thirty percent of maximum DISG torque is particularly advantageous in that enables the appropriate balance between providing driver demanded torque and conserving energy. Thus, as a result, the vehicle's torque response may be degraded, but electrical energy may be conserved. Method 500 proceeds to 520 after torque greater than driver demand based torque is supplied to the torque converter impeller.

At 520, method 500 determines a desired torque converter impeller speed in response to driver demand torque. In one example, the desired torque converter impeller speed is empirically determined and stored to memory. The torque converter impeller speed values stored in memory may be indexed via transmission oil temperature, driver demand torque, and torque converter turbine speed. Alternatively, the steady state torque converter impeller speed may be determined for the driver demand torque and torque converter turbine speed based on the equation:

$$T_{imp} = \left(\frac{N_{imp}}{CF}\right)^2$$

Where $T_{amp}$ is the torque converter impeller torque, $N_{imp}$ is the torque converter impeller speed, and CF is the torque converter capacity factor. Method 500 proceeds to 522 after the desired torque converter impeller speed is determined.

At 522, method 500 determines torque converter impeller compensation torque based on the present torque converter impeller speed and the desired torque converter impeller speed. In one example, the present torque converter impeller speed is subtracted from the desired torque converter impeller speed to determine a torque converter impeller speed error. The torque converter impeller speed error may be operated on via proportional, derivative, and integral gains to provide a torque adjustment. The proportional, derivative, and integral adjusted amounts may be added together to provide a torque adjustment amount. Method 500 proceeds to 524 after the torque converter impeller compensation torque is determined.

At 524, method 500 judges if the torque converter impeller speed is less than the desired torque converter impeller speed determined at 520. If method 500 judges that actual torque converter impeller speed is less than the desired torque converter impeller speed, the answer is yes and method 500 proceeds to 526. Otherwise, the answer is no and method 500 proceeds to 530.

At 526, method 500 applies the compensation torque to accelerator pedal based driver demand torque. In one example, the compensation torque determined at 522 is added to driver demand torque that is based on accelerator pedal position. The compensation torque and the accelerator pedal based driver demand torque are delivered by adjusting current supplied to the DISG. Method 500 returns to 520 after the compensation torque and the accelerator pedal based torque are applied to the driveline.

At 530, method 500 applies accelerator pedal based driver demand torque to the torque converter impeller. The accelerator pedal based driver demand torque may be provided via adjusting current supplied to the DISG. Method 500 proceeds to exit after the accelerator pedal based driver demand torque is applied to the torque converter impeller.

In addition, the driveline disconnect clutch may be closed in response to exceeding the torque converter fluid force transfer speed threshold at 514. The driveline disconnect clutch may be closed to start the engine so that additional torque may be provided to the driveline. Engine torque may be increased so that the driveline may provide the requested accelerator based driver demand torque. Further, gear clutches may be engaged in response to exceeding the torque converter fluid force transfer speed threshold at 514 since the transmission oil pump may develop sufficient pressure to close the driveline disconnect clutch and gear clutches at speed greater than the torque converter fluid force transfer speed threshold.

Thus, the method of FIG. 5 provides for a driveline method, comprising: applying a torque via a driveline integrated starter/generator (DISG) to a torque converter impeller from a condition where DISG rotation is stopped in response to a driver demand torque greater that a first threshold and less than a second threshold, the torque at least thirty percent greater than the driver demand torque. The method includes where the first threshold is less than five percent of a maximum driver demand torque. The method includes where the torque is applied until a predetermined DISG speed that is lower than a base engine idle speed is exceeded.

In some examples, the method includes where the DISG is mechanically coupled to the torque converter impeller. The method further comprises applying maximum DISG torque in response to driver demand torque exceeding the first threshold. The method further comprises reducing DISG torque to less than the torque that is at least thirty percent greater than the driver demand torque from the condition where DISG rotation is stopped in response to a driver selecting an economy mode.

In another example, the method of FIG. 5 provides for a driveline method, comprising: applying a first torque via a driveline integrated starter/generator (DISG) to a torque converter impeller from a condition where DISG rotation is stopped in response to a driver demand torque greater than a first threshold and less than a second threshold, the first torque at least thirty percent greater than the driver demand torque; and applying a second torque via the DISG to the torque converter impeller from a condition where the DISG is rotating and a vehicle in which the DISG operates is stopped in response to the driver demand torque greater than the first threshold and less than the second threshold, the second torque substantially equivalent (e.g., within ±5 percent of the commanded value) to the driver demand torque.

In some examples, the method includes where the second torque substantially equivalent to the driver demand torque is a torque with ±5 percent of the driver demand torque. The method further comprises reducing the first torque in response to the torque converter impeller achieving a fluid force transfer speed. The method includes where the fluid force transfer speed is a speed where maximum DISG torque may be applied to the torque converter impeller without providing more than a threshold level of torque to a transmission input shaft. The method includes where the DISG speed is at or less than a base engine idle speed when the vehicle in which the DISG operates is stopped. The method includes where the first threshold is greater than five percent of a maximum driver demand torque. The method further comprises applying maximum DISG torque in response to driver demand torque exceeding the first threshold when applying the first torque. The method further comprises reducing DISG torque to less than the first torque that is at least thirty percent greater than the driver demand torque from the condition where DISG rotation is stopped in response to a driver selecting an economy mode.

As will be appreciated by one of ordinary skill in the art, the methods described in FIG. 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A driveline method, comprising:
in response to a driver demand torque greater that a first threshold and less than a second threshold, applying a torque via a driveline integrated starter/generator (DISG) to a torque converter impeller from a condition where DISG rotation is stopped, the torque at least thirty percent greater than the driver demand torque.

2. The method of claim 1, where the first threshold is less than five percent of a maximum driver demand torque.

3. The method of claim 1, where the torque is applied until a predetermined DISG speed that is lower than a base engine idle speed is exceeded.

4. The method of claim 1, where the DISG is mechanically coupled to the torque converter impeller.

5. The method of claim 1, further comprising applying maximum DISG torque in response to driver demand torque exceeding the first threshold.

6. The method of claim 1, further comprising reducing DISG torque to less than the torque that is at least thirty percent greater than the driver demand torque from the condition where DISG rotation is stopped in response to a driver selecting an economy mode.

7. A driveline method, comprising:
in response to a driver demand torque greater than a first threshold and less than a second threshold, applying a first torque via a driveline integrated starter/generator (DISG) to a torque converter impeller from a condition where DISG rotation is stopped, the first torque at least thirty percent greater than the driver demand based torque; and
in response to the driver demand torque greater than the first threshold and less than the second threshold applying a second torque via the DISG to the torque converter impeller from a condition where the DISG is rotating and a vehicle in which the DISG operates is stopped, the second torque substantially equivalent to the driver demand based torque.

8. The method of claim 7, where the second torque substantially equivalent to the driver demand torque is a torque with ±5 percent of the driver demand torque.

9. The method of claim 7, further comprising reducing the first torque in response to the torque converter impeller achieving a fluid force transfer speed.

10. The method of claim 9, where the fluid force transfer speed is a speed where maximum DISG torque may be applied to the torque converter impeller without providing more than a threshold level of torque to a transmission input shaft.

11. The method of claim 7, where DISG speed is at or less than a base engine idle speed when the vehicle in which the DISG operates is stopped.

12. The method of claim 7, where the first threshold is greater than five percent of a maximum driver demand torque.

13. The method of claim 7, further comprising applying maximum DISG torque in response to driver demand torque exceeding the first threshold when applying the first torque.

14. The method of claim 7, further comprising reducing DISG torque to less than the first torque that is at least thirty percent greater than the driver demand torque from the condition where DISG rotation is stopped in response to a driver selecting an economy mode.

15. A driveline system, comprising:
an engine;
an electric machine;
an automatic transmission;
a torque converter positioned between the automatic transmission and the electric machine;
a controller including executable instructions stored in non-transitory memory to in response to a driver demand torque less than a maximum torque of the electric machine, apply maximum torque of the electric machine to a torque converter impeller from a condition where electric machine rotation is stopped.

16. The driveline system of claim 15, further comprising additional instructions for reducing electric machine torque to less than the maximum torque of the electric machine from the condition where electric machine rotation is stopped in response to a driver selecting an economy mode.

17. The driveline system of claim 15, further comprising additional instructions for reducing the maximum torque of the electric machine in response to the torque converter impeller achieving a fluid force transfer speed.

18. The driveline system of claim 17, further comprising additional instructions for applying the driver demand torque to the torque converter impeller via adjusting electric machine speed to a speed that provides the driver demand torque at the torque converter impeller.

19. The driveline system of claim 15, further comprising reducing application of torque to the torque converter impeller from the condition where electric machine rotation is stopped in response to selection of an economy mode.

20. The driveline system of claim 15, further comprising additional instructions for applying the driver demand torque to the torque converter impeller in response to an increase in the driver demand torque when a vehicle in which the electric machine operates is stopped and the electric machine is rotating.

* * * * *